US011237838B2

(12) United States Patent
Pamoti et al.

(10) Patent No.: US 11,237,838 B2
(45) Date of Patent: Feb. 1, 2022

(54) STORAGE SYSTEM AND METHOD FOR ENABLING A DIRECT ACCESSIBLE BOOT BLOCK IN A MEMORY DIE

(71) Applicant: Western Digital Technologies, Inc., San Jose, CA (US)

(72) Inventors: Venkatesh Naidu Pamoti, Andhra Pradesh (IN); Ramanathan Muthiah, Bangalore (IN); Gnanasekar Rajakumar, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 6 days.

(21) Appl. No.: 16/732,649

(22) Filed: Jan. 2, 2020

(65) Prior Publication Data

US 2021/0208900 A1 Jul. 8, 2021

(51) Int. Cl.
*G06F 11/14* (2006.01)
*G06F 9/4401* (2018.01)
*G06F 3/06* (2006.01)

(52) U.S. Cl.
CPC ............ *G06F 9/4406* (2013.01); *G06F 3/068* (2013.01); *G06F 3/0617* (2013.01); *G06F 3/0659* (2013.01); *G06F 11/1417* (2013.01); *G06F 2201/805* (2013.01)

(58) Field of Classification Search
CPC .... G06F 11/14; G06F 11/1417; G06F 3/0659; G06F 3/0617
See application file for complete search history.

(56) References Cited

U.S. PATENT DOCUMENTS

| 6,615,404 B1* | 9/2003 | Garfunkel | G06F 8/654 717/173 |
| 7,734,945 B1* | 6/2010 | Levidow | G06F 11/0793 714/3 |
| 7,797,693 B1* | 9/2010 | Gustafson | G06F 11/1433 717/168 |
| 8,589,730 B2* | 11/2013 | Byom | G06F 11/0787 714/16 |

(Continued)

OTHER PUBLICATIONS

Ye, Roger; "Embedded Ptogramming with Android: Using U-Boot to Boot the Goldfish Kernel"; Informit; Chapter from Embedded Programming with Android; Bringing Up an Android System from Scratch; downloaded from the Internet on Sep. 12, 2019 at http://www.informit.com/articles/printerfriendly/2431471; 21 pages; Sep. 1, 2015.

(Continued)

*Primary Examiner* — Kamini B Patel
(74) *Attorney, Agent, or Firm* — Crowell & Moring LLP (57) ABSTRACT

A storage system and method for enabling a direct accessible boot block in a memory die are disclosed. In one embodiment, a storage system is provided comprising a NAND memory, a volatile memory, a processor, and a NAND controller. The NAND controller is configured to perform the following in response to receiving a command from the processor at power-up: read bootloader code from the NAND memory; and execute the bootloader code, wherein execution of the bootloader code causes initialization code to be read from the NAND memory and stored in the volatile memory. Other embodiments are provided.

16 Claims, 7 Drawing Sheets

(56) References Cited

U.S. PATENT DOCUMENTS

| | | | |
|---|---|---|---|
| 9,026,848 B2* | 5/2015 | Abraham | G06F 11/1482 |
| | | | 714/11 |
| 9,485,379 B2* | 11/2016 | Suzuki | G06F 9/4406 |
| 9,734,117 B2 | 8/2017 | McCabe et al. | |
| 10,372,603 B2* | 8/2019 | Muthiah | G06F 3/0688 |
| 10,725,901 B2* | 7/2020 | Muthiah | G06F 13/1626 |
| 2003/0005278 A1 | 1/2003 | Deng et al. | |
| 2004/0076069 A1 | 4/2004 | Voth et al. | |
| 2004/0139307 A1 | 7/2004 | Barnett | |
| 2004/0230738 A1 | 11/2004 | Lim et al. | |
| 2005/0160219 A1* | 7/2005 | Oh | G06F 9/4401 |
| | | | 711/103 |
| 2006/0236198 A1* | 10/2006 | Lintz, Jr. | G06F 11/0781 |
| | | | 714/758 |
| 2007/0088940 A1 | 4/2007 | Conley | |
| 2012/0151202 A1 | 4/2012 | Clerc et al. | |
| 2014/0013097 A1* | 1/2014 | Wu | G06F 1/24 |
| | | | 713/2 |
| 2014/0089655 A1* | 3/2014 | Lambert | G06F 9/4416 |
| | | | 713/2 |
| 2014/0095927 A1* | 4/2014 | Abraham | G06F 11/00 |
| | | | 714/6.12 |
| 2016/0154700 A1* | 6/2016 | Tian | G06F 12/0653 |
| | | | 714/15 |
| 2019/0163620 A1* | 5/2019 | Muthiah | G06F 3/064 |
| 2019/0370168 A1* | 12/2019 | Muthiah | G06F 3/0659 |
| 2020/0379643 A1* | 12/2020 | Muthiah | G06F 3/061 |

OTHER PUBLICATIONS

International Search Report dated Oct. 27, 2020 for International Application No. PCT/US2020/037743.
Written Opinion dated Oct. 27, 2020 for International Application No. PCT/US2020/037743.

* cited by examiner

STORAGE SYSTEM AND METHOD FOR ENABLING A DIRECT ACCESSIBLE BOOT BLOCK IN A MEMORY DIE

BACKGROUND

Storage systems typically have read-only memory (ROM), which stores instructions that are used to boot-up the storage system. For example, when the storage system is powered on, a central processing unit (CPU) in the storage system can fetch instructions (code) from Address 0 in the ROM, and execution of the instructions can take place in the ROM. The executed instructions cause the CPU to scan for boot blocks in non-volatile memory (e.g., NAND) in the storage system. If the boot blocks are not present, the CPU waits in an idle loop. If the boot blocks are found, the CPU copies bootloader (BLR) code from the NAND to random access memory (RAM). The CPU then starts execution of BLR code in the RAM, which in turn downloads Flashware code to enable operation of other functions of the storage system.

DETAILED DESCRIPTION

Overview

By way of introduction, the below embodiments relate to a storage system and method for enabling a direct accessible boot block in a memory die. In one embodiment, a storage system is provided comprising a NAND memory, a volatile memory, a processor, and a NAND controller. The NAND controller is configured to perform the following in response to receiving a command from the processor at power-up: read bootloader code from the NAND memory; and execute the bootloader code, wherein execution of the bootloader code causes initialization code to be read from the NAND memory and stored in the volatile memory.

In some embodiments, the processor is configured to read secondary bootloader code from the NAND memory in response to an error.

In some embodiments, the error comprises a problem with the execution of the bootloader code that prevents the initialization code from being read from the NAND memory.

In some embodiments, the error comprises an error in the initialization code.

In some embodiments, the bootloader code in executed in place in the NAND memory.

In some embodiments, an address of the bootloader code in the NAND memory is mapped in the processor.

In some embodiments, the NAND memory comprises a three-dimensional memory.

In some embodiments, the storage system is configured to be integrated in a host.

In some embodiments, the storage system is configured to be removably connected with a host.

In another embodiment, a method for booting a storage system is presented that is performed in a storage system comprising NAND memory. The method comprises: attempting to load first stage bootloader code from the NAND memory at start-up of the storage system; in response to the attempt to load the first stage bootloader code from the NAND memory being successful, executing the first stage bootloader code; using the executed first stage bootloader code to load initialization code from the NAND memory and executing the initialization code; and using the executed initialization code to load a bootloader code from the NAND memory and executing the bootloader code to boot the storage system.

In some embodiments, the method further comprises in response to the attempt to execute the first stage bootloader code from the NAND memory being unsuccessful, attempting to read a secondary copy of the first stage bootloader code from the NAND memory.

In some embodiments, the method further comprises determining whether the initialization code is required.

In some embodiments, the method further comprises determining whether boot blocks are present in the NAND memory; and in response to determining that boot blocks are not present in the NAND memory, downloading a tool to create a boot block.

In some embodiments, the method further comprises performing a watchdog function in response to an error.

In another embodiment, a storage system is presented comprising a NAND memory configured to store bootloader code and initialization code; means for reading the bootloader code from the NAND memory; and means for executing the bootloader code, wherein execution of the bootloader code causes the initialization code to be read from the NAND memory to boot the storage system.

In some embodiments, the storage system further comprises means for reading secondary bootloader code from the NAND memory in response to an error.

In some embodiments, the error comprises a problem with the execution of the bootloader code that prevents the initialization code from being read from the NAND memory.

In some embodiments, the error comprises an error in the initialization code.

In some embodiments, the NAND memory comprises a three-dimensional memory.

In some embodiments, the storage system is configured to be integrated in a host.

Other embodiments are possible, and each of the embodiments can be used alone or together in combination. Accordingly, various embodiments will now be described with reference to the attached drawings.

Embodiments

Figures 1A, 1B:
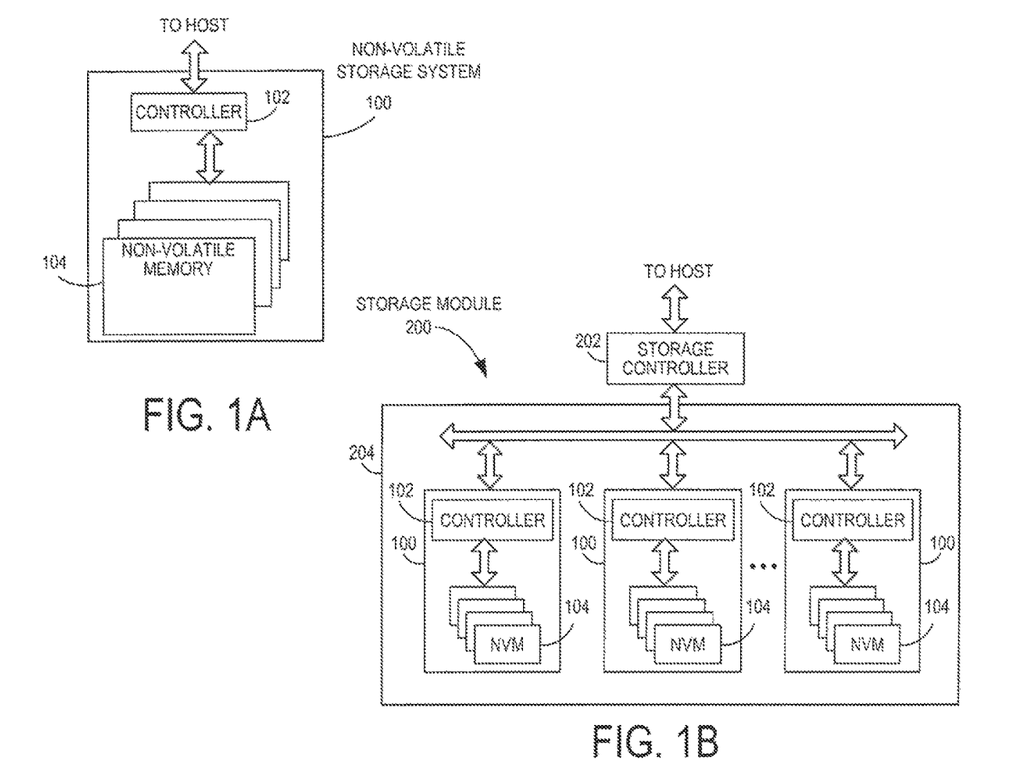
FIG. 1A is a block diagram of a non-volatile storage system of an embodiment.
FIG. 1B is a block diagram illustrating a storage module of an embodiment.
Figure 1C:
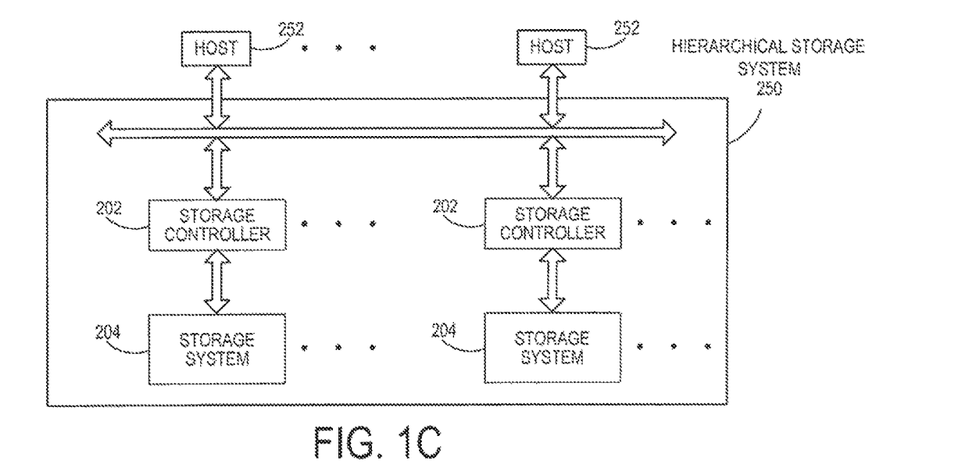
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SI) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
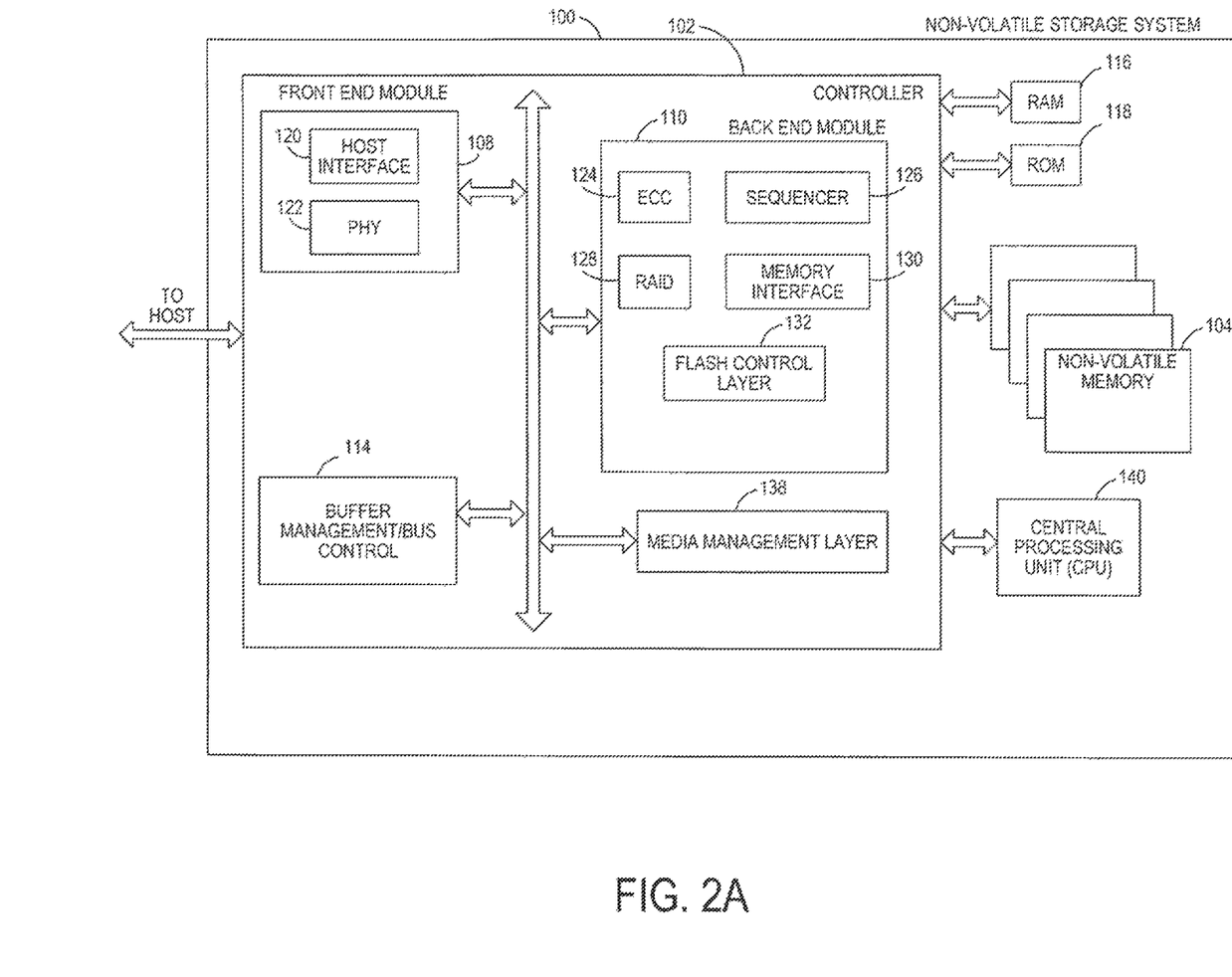
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fiber Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes a central processing unit 140.

Figure 2B:
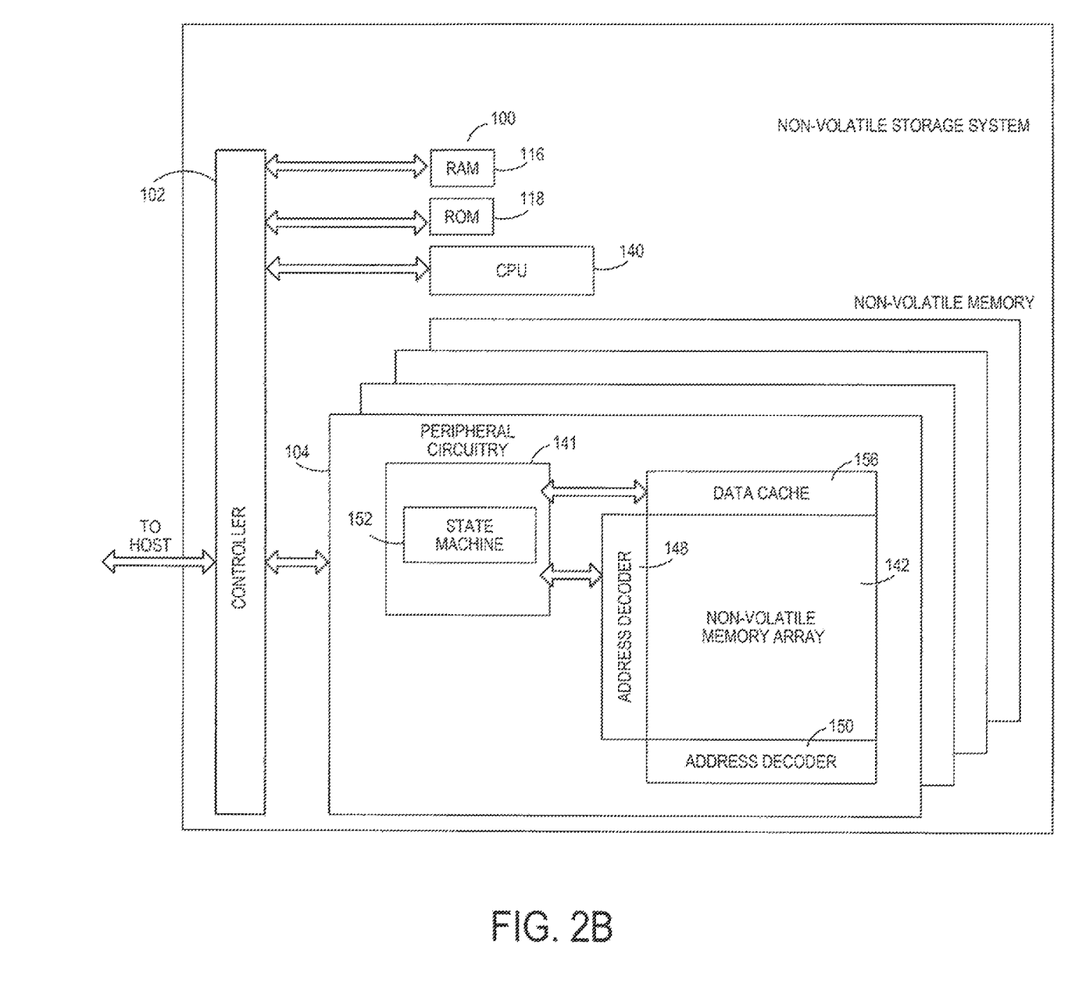
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR, flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTI can be recovered in the event of a sudden power loss) and wear leveling (so that the wear across memory blocks is even to prevent certain blocks from excessive wear, which would result in a greater chance of failure).

Figure 3:
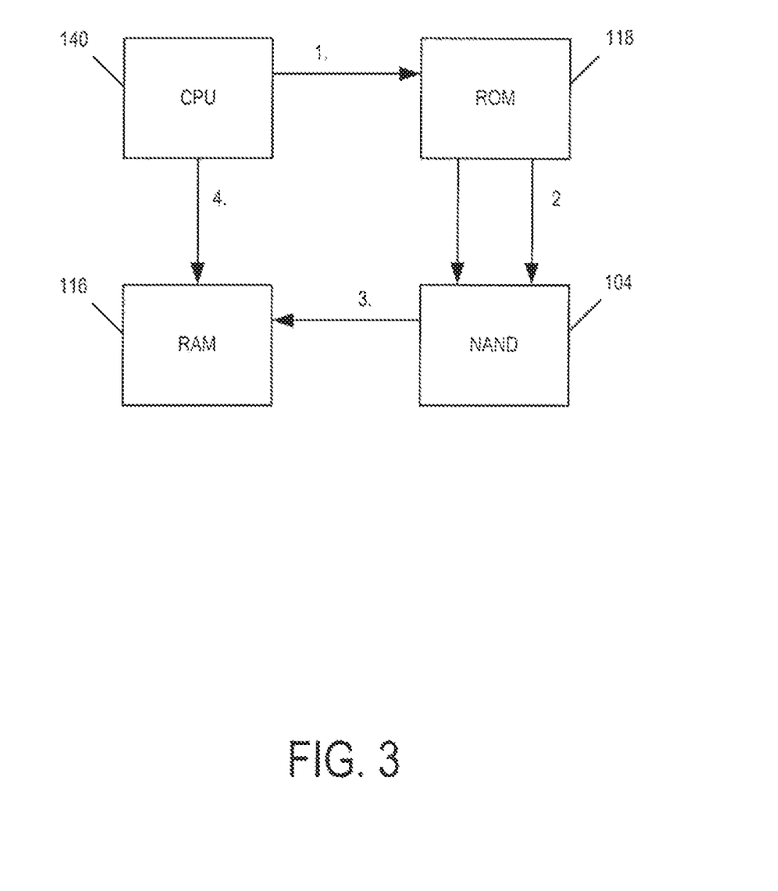
FIG. 3 is a block diagram illustrating a typical boot flow.

As mentioned above and with reference to the block diagram in FIG. 3, storage systems typically have ROM 118, which stores instructions that are used to boot-up the storage system. For example, when the storage system is powered on, the CPU 140 can fetch instructions (code) from Address 0 in the ROM 118, and execution of the instructions can take place in the ROM 118 (act 1). The executed instructions cause the CPU 140 to scan for boot blocks in non-volatile memory (e.g., NAND) 104 in the storage system (act 2). If the boot blocks are not present, the CPU 140 waits in an idle loop. If the boot blocks are found, the CPU 140 copies bootloader (BLR) code from the NAND 104 to RAM 116 (act 3). The CPU 140 then starts execution of BLR, code in RAM 116 (act 4), which in turn downloads Flashware code to enable operation of other functions of the storage system.

A considerable amount of time and energy is spent in developing the ROM code. ROM becomes a critical component because the processor instructions are hardwired into an application-specific integrated circuit (ASIC) and taped out. If any bug is found in ROM, additional cost and time are needed to fix the problem in the ASIC. To address this, some manufacturers focus on minimizing the amount of code in ROM to perform only basic initialization and jumping to Flashware, Other manufacturers use a small ROM with built-in initialization code that will load Flashware from non-volatile memory to volatile memory and start execution. Some other manufacturers use NOR flash that support execution in place (XIP) through which the processor can directly boot out. Using NOR flash instead of ROM can cut down the ROM development cycle, which can be at least six months long. Programmers can directly write the Flashware into NOR flash, and the first stage bootloader (FSBL) can be fused in the factory at the time of production. For every class of products using NOR flash, the ROM development cycle can be completely avoided, providing a faster time to market.

While it provides high reliability and a good transfer rate for a simple bootloader, NOR flash is expensive. While such an expense may be justified for high-end products where cost is not a major factor, NOR flash may be cost-prohibitive for lower-end products. To address this, the following embodiments can be used to remove the dependency on ROM by enabling a hardware direct accessible boot block in NAND, which can be directly read by the hardware (e.g., processor/controller) without any software intervention. These embodiments provide reduced cost while providing many advantages similar to using NOR flash (e.g., avoiding ROM development cycle time, avoiding processor-specific code hardwired in a system on chip (SoC), faster time to market, and eliminating the risk of hardware bugs, which can be costly in terms of re-spin or delay in product development).

In one embodiment, the boot block in NAND can be directly read by hardware without any firmware or software intervention. In this embodiment, a hardware-accessible boot region present in the NAND memory die 104 can be directly read by the processor 140. In one embodiment, the memory 104 supports execution in place (XIP). When the processor 140 comes out of reset, it starts reading the boot vector and jumps to the memory location pointed to by the boot vector. The boot vector can be decoded to this region in the memory die 104 and can be directly readable by the hardware. This can act as a first stage boot loader (FSBL). The code flashed in this region can be simple code to initialize the interfaces to access the next level of memories and load the next stage bootloader or Flashware to the RAM 116.

It should be noted that while less expensive than NOR flash, NAND flash may be less reliable. However, since the bootblock is not accessed often (only during boot time), the chance of failure in these blocks is relatively low. High endurance NAND memory can be used for the FSBL to provide a better endurance rate for these blocks.

Figure 4:
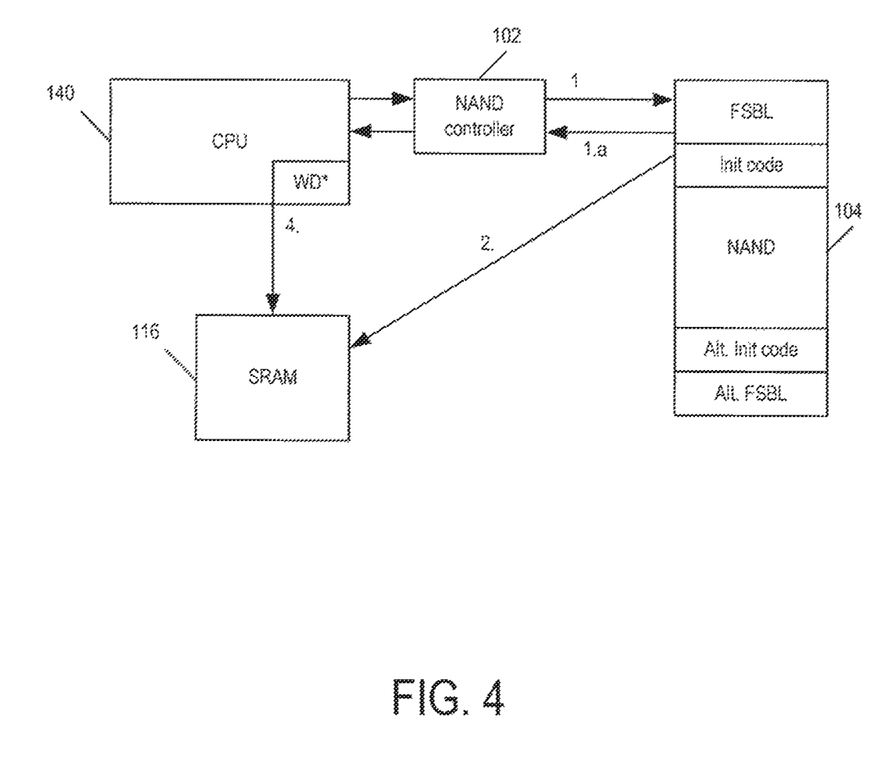
FIG. 4 is a block diagram illustrating a boot flow of an embodiment.

Turning again to the drawings, FIG. 4 is a block diagram illustrating a boot flow of an embodiment. In this embodiment, the NAND controller 102 is operating in an execute in place (XIP) mode, in which the NAND controller 102 can support read operations/commands that will fetch processor instructions based on processor's program counter. The bootloader address in the NAND 104 can be memory mapped into the processor 140, and it can appear as an internal memory. The NAND controller 102 can generate read opcodes to give direct access to the NAND memory 104 during boot time. In some embodiments, only a very small section of the NAND memory 104 will support XIP to load the initial bootloader.

As shown in FIG. 4, at power-on, the CPU 140 fetches instructions from Address 0 in the NAND memory 104. The NAND controller 102 decodes address 0 and generates a read command to the NAND's fixed address (act 1). This address has the first stage bootloader (FSBL), and the read data is the instruction that will be executed by the CPU 140 (act 1*a*). The code present in this FSBL, which can be a very small, in turn copies secondary initialization code (which is in ROM in prior storage systems) to RAM 116 (act 2). This initialization code checks for the boot block and either waits if the boot block is not present or proceeds with the BLR and Flashware download (act 3).

It may be preferred that the bootblock be reliable enough and stable enough to provide good results. To do this, it may be preferred to ensure that error correction code errors do not occur in the NAND boot region. Calibration/initialization of the NAND may not be necessary. However, a storage system can be equipped with extra hardware to perform calibration/initialization and/or error correction In one embodiment, a watchdog module (WD) is started on power up, and the secondary initialization code will have the code to disable the WD. Two scenarios are possible where the secondary initialization code is not executed. In one scenario, fetched instructions from the NAND 104 are incorrect, and the processor 140 cannot jump to the secondary initialization code. In that case, the processor 140 will hit an exception, and the watchdog module can activate when it expires to reset the storage system 100. Whenever the watchdog module reset happens in this phase, hardware logic in the storage system 100 can switch to fetch the code from alternate FSBL (a second copy) in the NAND 104.

In another scenario, the NAND 104 jumps to the secondary initialization code, checks the cyclical redundancy check (CRC) of the code that was copied, and compares it against the preprogrammed CRC. If a CRC mismatch happens or if the process could not be completed for some reason, the watchdog module cannot be stopped. If the reset happens in this phase, the FSBL logic would fetch secondary code from an alternate memory region after the watchdog module resets.

Figure 5:
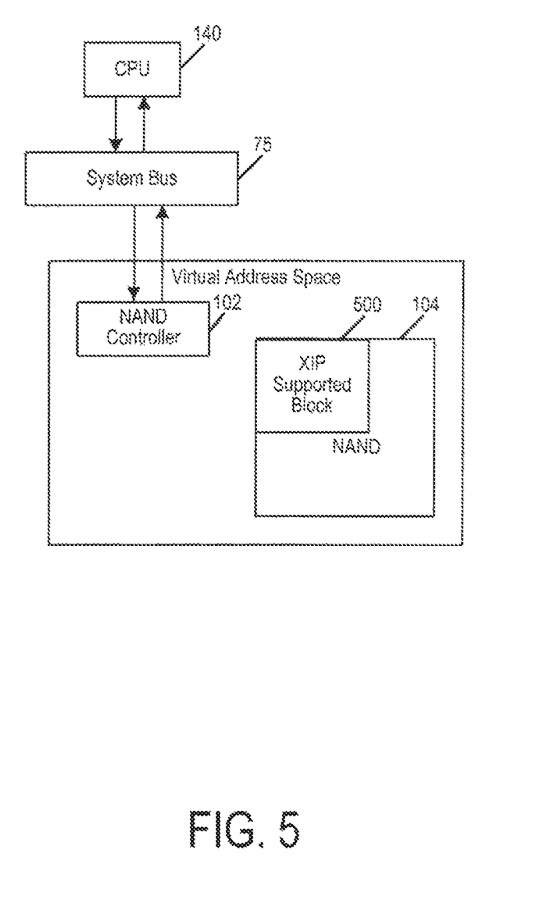
FIG. 5 is a block diagram illustrating a boot flow of an embodiment.

Returning to the drawings, FIG. 5 provides a block diagram that illustrates other features of an embodiment. In this embodiment, the CPU 140 starts executing from a pre-defined address (e.g., "0"), and the size of the XIP section size is "x." For the CPU 140, 0-*x* is the virtual address space and does not exist in the system. The CPU 140 places an instruction fetch request on the system bus 75 to get the instructions for address 0 to x. On receiving the read request in the virtual address space, the bus controller re-directs the read to the NAND controller 102. The NAND controller 102 converts this virtual address to a flash-understandable address (e.g., die, plane, block, word-line, and column) before sending it to the NAND 104. After which, the NAND controller 102 toggles out the data. The toggled-out data is given as a response to the system bus read request, which will be sent to CPU 140.

As mentioned above, these embodiments can be used to remove the ROM in the storage device and reduce the development cycle and ASIC tape-out time. Also, since NAND is rewritable, bugs can easily be fixed, as compare to ROM, which requires another spin of the ASIC. In general, the ROM code can initialize certain components (e.g., interfaces, clocks, and regulators), detect the type of NAND and its geometry (e.g., which technology is used and the number of planes, dies, and blocks), and/or find a boot block in the NAND and load the bootloader or Flashware code. (The terms ROM code and initialization code will be used interchangeably herein.)

Also, the first stage bootloader (FSBL) can have the capability to copy the initialization code from the NAND 102 to the RAM 116 and ask the processor 140 to jump to the start of the initialization code. The initialization code can be laced in timing-sensitive platforms, where executing from NAND is costly in terms of time. If this is not a concern, the FSBL can do the same job as the initialization code and load the Flashware code or bootloader code directly.

The FSBL, being in NAND 104, can be programmed many number of times and does not influence the ASIC tape-out time. In addition, the same design can be used in other platforms once verified without any change in hardware or software. Basic FSBL without initialization code remains constant. If the FSBL has initialization code, the FSBL can change from platform to platform depending on how the hardware used its configuration.

Figure 6:
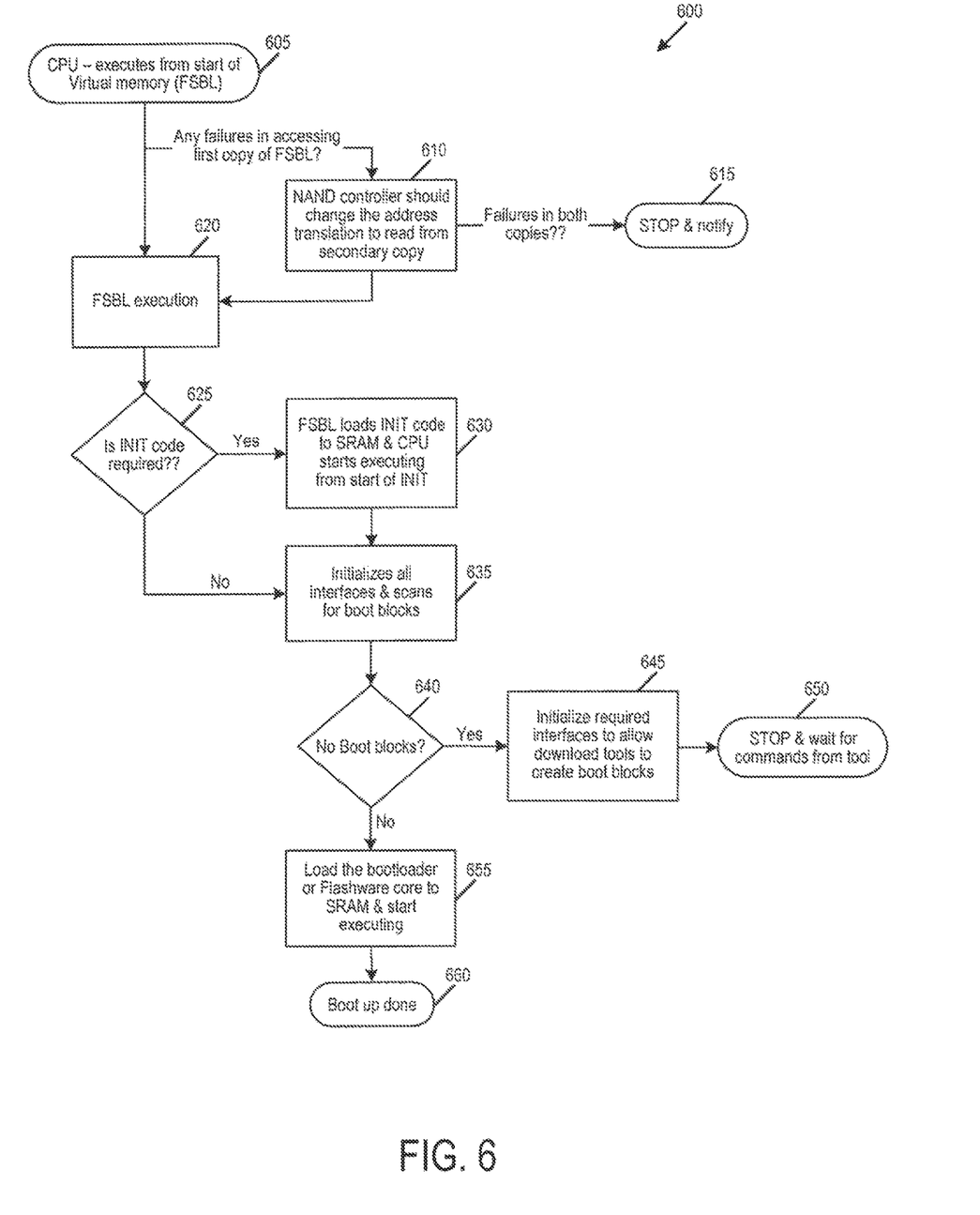
FIG. 6 is a flow chart of a method of an embodiment for booting from a memory die.

Turning now to FIG. 6, FIG. 6 is a flowchart 600 of a method of an embodiment for booting from a memory die. As shown in FIG. 6, the CPU 140 executes from the start of virtual memory to load the FSBL (act 605). If there are any failures in accessing the first copy of the FSBL, the NAND controller 102 changes the address translation to read from the secondary copy (act 610). If there are failures in both copies, the method stops, and an error notification is sent (act 615). Otherwise, the working copy of the FSBL is executed (act 620). It is then determined if initialization code is required (act 625)). If it is, the FSBL loads the initialization code to SRAM 116, and the CPU 140 starts executing from the start of the initialization code (act 630). Otherwise, the CPU 140 initializes all interfaces and scans for boot blocks (act 635).

Next, it is determined if there are boot blocks (act 640). If there are boot blocks, the CPU 140 loads the bootloader or Flashware code to SRAM 116 and executes it, after which, boot up is done (act 655 and 660). If there are no boot blocks, the CPU 140 initializes the required interfaces to allow tools to create boot blocks in NAND (act 645). The CPU 140 then stops and waits for commands from the tool (act 650).

It should be noted that, in one embodiment, if no boot blocks are found, the FSBL can have instructions to initialize the required interfaces (e.g., the host interface module on the host side, the flash interface module on the memory side, etc.), which helps in interacting with tools or software on the host to enable boot block creation.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a NAND memory;
   a volatile memory;
   a processor; and
   a NAND controller configured to be in communication with the NAND memory, the volatile memory, and the processor, wherein the NAND controller is further configured to perform the following in response to receiving a command from the processor at power-up:
   read bootloader code from the NAND memory; and
   execute the bootloader code, wherein execution of the bootloader code causes initialization code to be read from the NAND memory and stored in the volatile memory;
   wherein:
   the processor is configured to execute watchdog code upon power-up of the storage system, which, when executed, causes the processor to reset the storage system and read alternate code from the NAND memory in response to a mismatch between a cyclical redundancy check (CRC) code of the initialization code and a programmed CRC code; and
   the initialization code comprises code to disable the watchdog code, whereby successful execution of the initialization code disables the watchdog code.

2. The storage system of claim 1, wherein execution of the initialization code was unsuccessful due to a problem with the execution of the bootloader code that prevents the initialization code from being read from the NAND memory.

3. The storage system of claim 1, wherein execution of the initialization code was unsuccessful due to an error in the initialization code.

4. The storage system of claim 1, wherein the bootloader code is executed in place in the NAND memory.

5. The storage system of claim 1, wherein an address of the bootloader code in the NAND memory is mapped in the processor.

6. The storage system of claim 1, wherein the NAND memory comprises a three-dimensional memory.

7. The storage system of claim 1, wherein the storage system is configured to be integrated in a host.

8. The storage system of claim 1, wherein the storage system is configured to be removably connected with a host.

9. The storage system of claim 1, wherein execution of the initialization code was unsuccessful due to an incorrect instruction.

10. The storage system of claim 1, wherein execution of the initialization code was unsuccessful due to an inability to jump to the alternate code.

11. A method for booting a storage system, the method comprising:
    performing the following in a storage system comprising a processor and a NAND memory:
    executing a watchdog function in the processor at start-up of the storage system;
    attempting to load first stage bootloader code from the NAND memory at start-up of the storage system;
    in response to the attempt to load the first stage bootloader code from the NAND memory being successful:
    executing the first stage bootloader code;
    using the executed first stage bootloader code to load initialization code from the NAND memory;
    executing the initialization code;
    using the executed initialization code to load a bootloader code from the NAND memory; and
    executing the bootloader code to boot the storage system, wherein the initialization code comprises code to disable the watchdog function, whereby successful execution of the initialization code disables the watchdog function; and
    in response to the attempt to load the first stage bootloader code from the NAND memory being unsuccessful because of a mismatch between a cyclical redundancy check (CRC) code of the first stage bootloader code and a programmed CRC code:
    resetting the storage system; and
    reading alternate code from the NAND memory.

12. The method of claim 11, further comprising determining whether the initialization code is required.

13. The method of claim 11, further comprising:
    determining whether boot blocks are present in the NAND memory; and
    in response to determining that boot blocks are not present in the NAND memory, allowing downloading of a tool to create a boot block.

14. The method of claim 11, wherein execution of the initialization code was unsuccessful due to an incorrect instruction.

15. The method of claim 11, wherein execution of the initialization code was unsuccessful due to an inability to jump to the alternate code.

16. A storage system comprising:
    a NAND memory configured to store bootloader code and initialization code;
    means for executing a watchdog function at start-up of the storage system;
    means for attempting to load first stage bootloader code from the NAND memory at start-up of the storage system;
    means for, in response to the attempt to load the first stage bootloader code from the NAND memory being successful:
    executing the first stage bootloader code, using the executed first stage bootloader code to load initialization code from the NAND memory, executing the initialization code,
using the executed initialization code to load a bootloader code from the NAND memory, and
executing the bootloader code to boot the storage system, wherein the initialization code comprises code to disable the watchdog function, whereby successful execution of the initialization code disables the watchdog function; and
means for, in response to the attempt to load the first stage bootloader code from the NAND memory being unsuccessful because of a mismatch between a cyclical redundancy check (CRC) code of the first stage bootloader code and a programmed CRC code:
resetting the storage system; and
reading alternate code from the NAND memory.

* * * * *